United States Patent [19]
Morgan

[11] 3,917,323
[45] Nov. 4, 1975

[54] CONNECTING APPARATUS FOR AN AIR DUCT SYSTEM

[76] Inventor: John P. Morgan, 10810 Algonquin, Apt. 406, Houston, Tex. 77034

[22] Filed: Sept. 12, 1973

[21] Appl. No.: 396,502

[52] U.S. Cl. .................... 285/189; 85/3; 285/399; 285/424
[51] Int. Cl.² .................... F16L 5/02; F16L 41/00
[58] Field of Search .................. 285/189, 424, 399; 126/318; 85/3

[56] References Cited
UNITED STATES PATENTS

| | | | |
|---|---|---|---|
| 2,221,854 | 11/1940 | Zalkind | 285/424 X |
| 2,330,769 | 9/1943 | Wichner | 285/399 X |
| 2,916,054 | 12/1959 | Callan | 285/424 X |
| 3,010,353 | 11/1961 | Psaros | 285/424 X |
| 3,023,032 | 2/1962 | Johnston et al. | 285/424 X |
| 3,811,714 | 5/1974 | Pintard | 285/424 X |

Primary Examiner—H. Hampton Hunter
Attorney, Agent, or Firm—W. F. Hyer; Marvin B. Eichenroht

[57] ABSTRACT

Apparatus is disclosed for connecting components of the duct work of a heating or air conditioning system, or a combined system, where one of the components to be connected is made of duct board such as fiber board, or other relatively easily penetrable material. The connecting apparatus includes an elongated strip member for overlapping the ends of adjacent duct components to be connected, and this strip member is made of material, such as sheet metal, which may be cut or bent to conform with the joint to be made. Slots are provided in the strip member so that a pull tie having an enlarged head portion and a tail portion or pull member may be inserted through the strip member and through the fiber board and then the tail portion pulled and twisted to secure the strip member to the fiber board. Various forms of the strip member and methods employing such apparatus are also disclosed.

18 Claims, 13 Drawing Figures

U.S. Patent  Nov. 4, 1975  Sheet 1 of 3  3,917,323
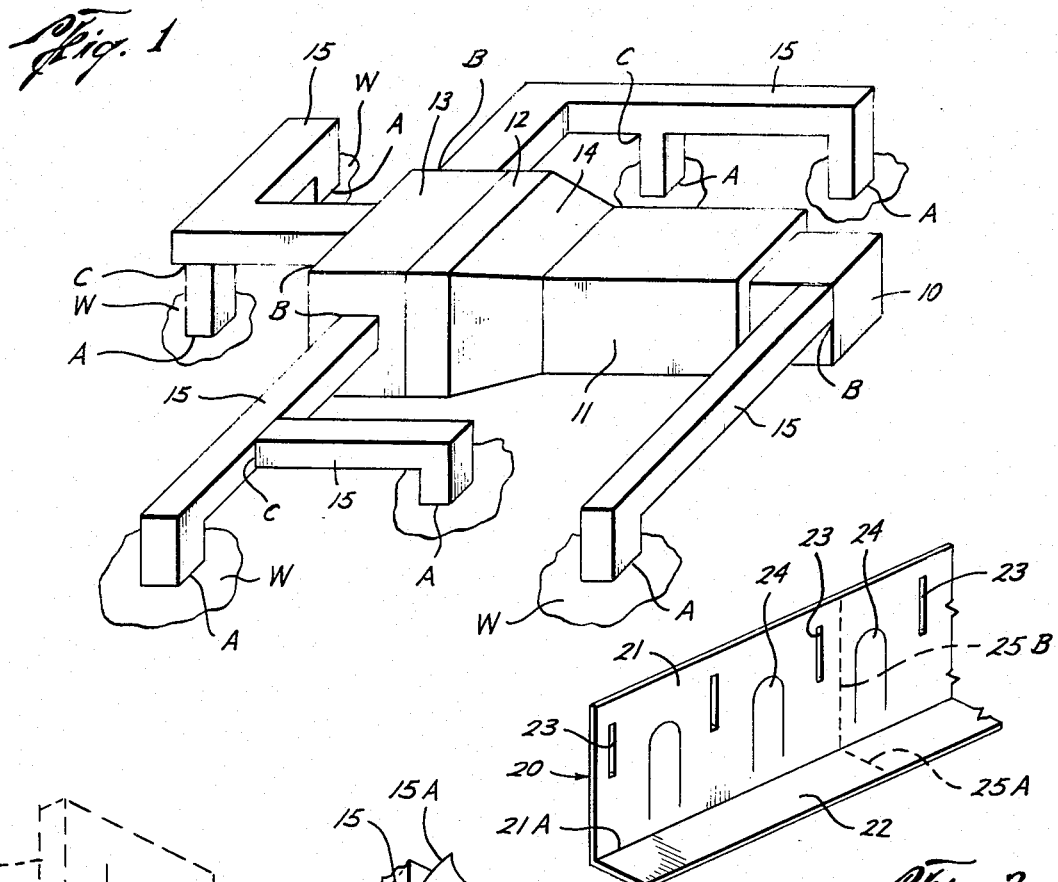
Fig. 1
Fig. 2
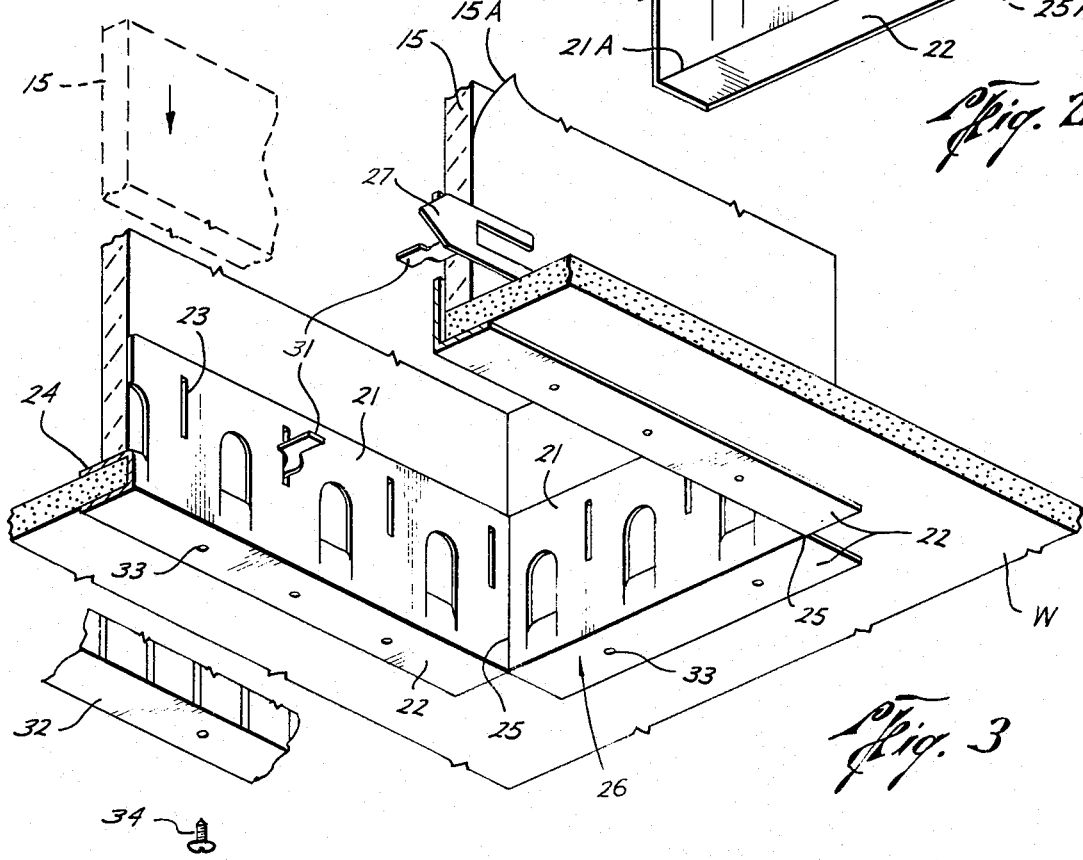
Fig. 3

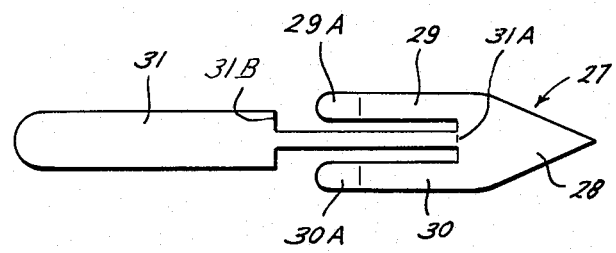
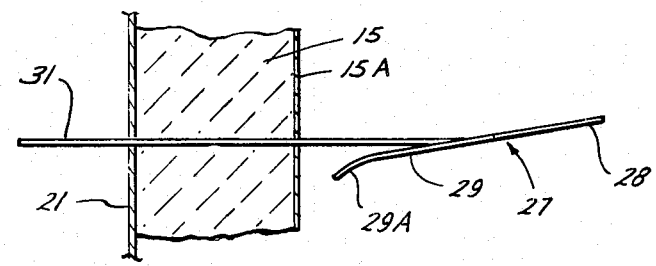
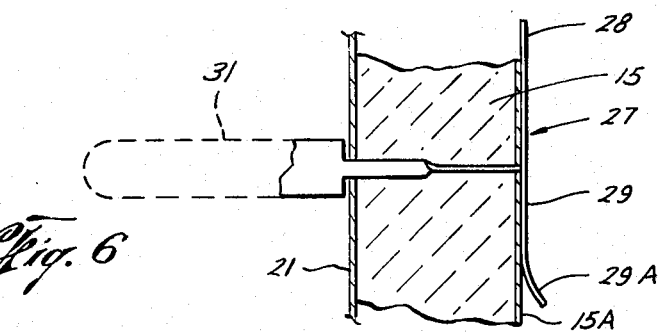
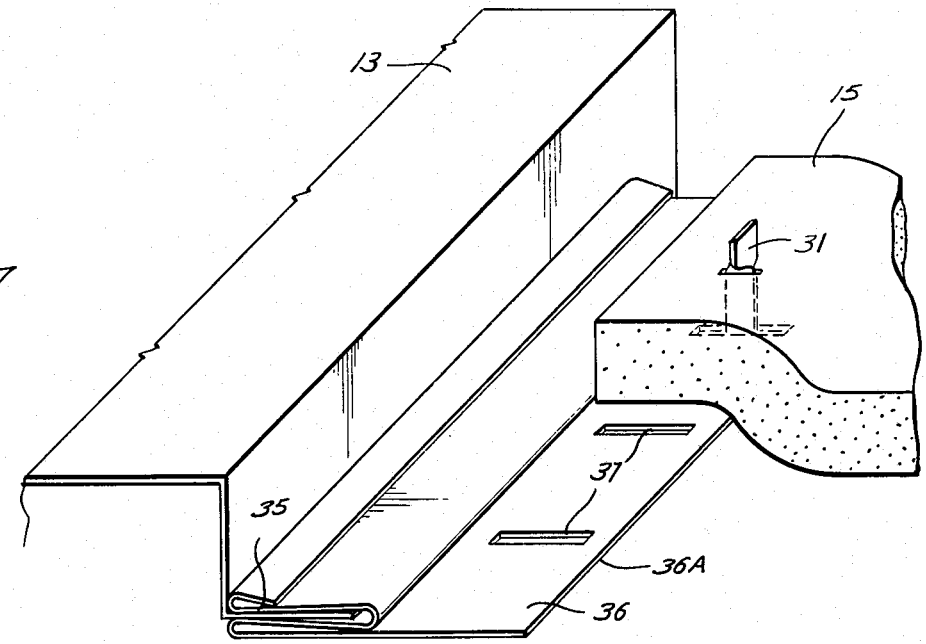

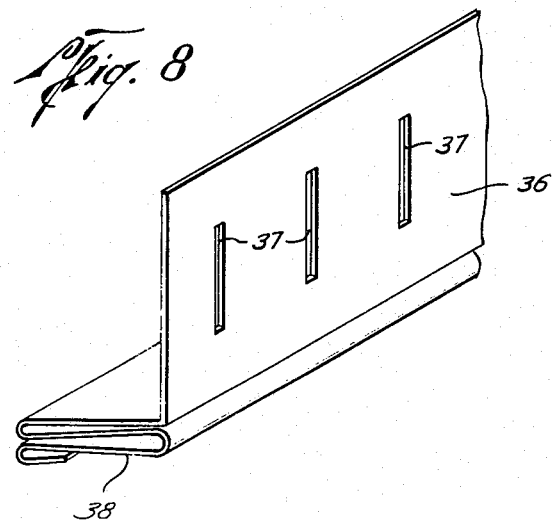
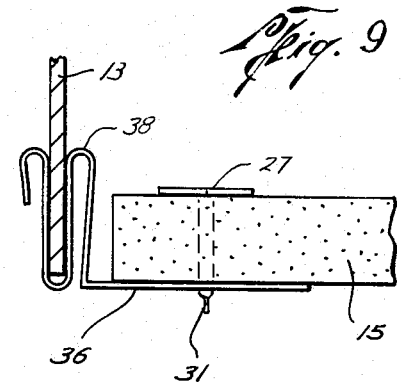
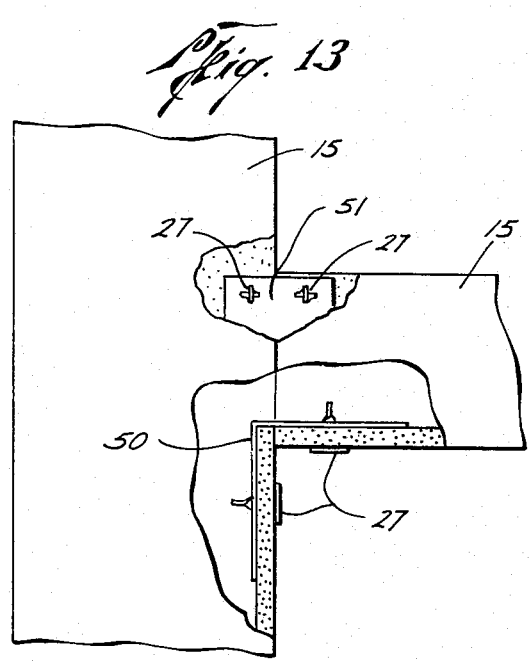
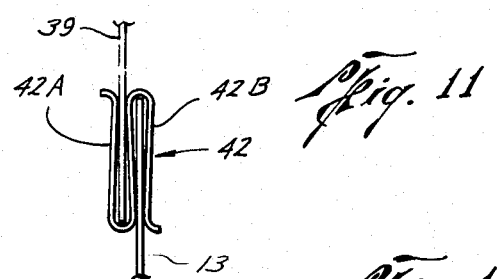
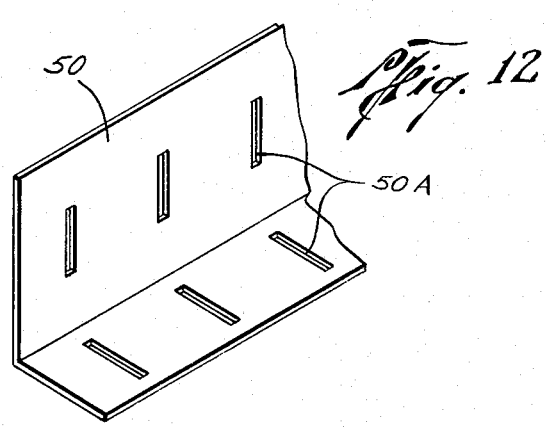
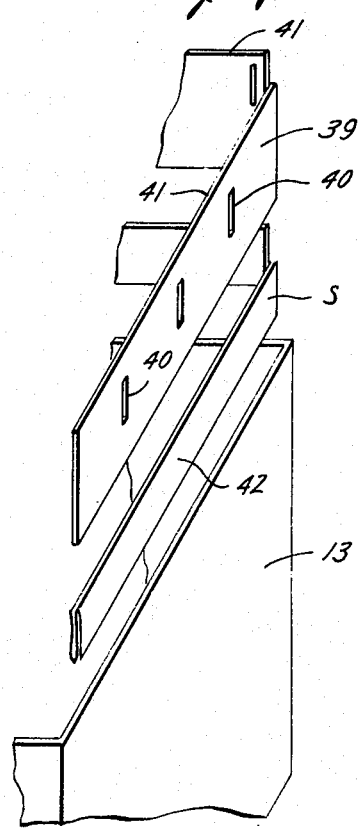

CONNECTING APPARATUS FOR AN AIR DUCT SYSTEM

This invention relates to apparatus for connecting adjacent members of the duct work of an air flow system, particularly where one of the members is made of duct board.

In the installation of heating and air conditioning systems, it is common to provide duct work made of duct board, which is generally compressed fiber glass having an aluminum foil covering on one side. In the typical duct work system, it is necessary to connect duct board members to sheet metal plenums, such as from the heater or air conditioner itself, to connect the duct board about an opening in the wall of a ceiling, and to connect duct board members running in one direction to duct board members running perpendicular thereto. In all of these connections, it is desirable that they be easily and quickly made and that they be substantially air tight so that conditioned air or heated air is not lost in the attic of the building being heated or air conditioned. Also, it is desirable that the connection between the duct system and outlets in the ceiling or attic floor be such that no framing is required in order to make the connection.

In the past, it has been customary to connect some of the adjacent members of a duct board type of duct system by a special tape and staples. This type of connection is subject to leakage as the adhesiveness of the tape lessens with age. Also, in these typical systems it is customary to construct a wood frame around each of the air outlet openings (or the air intake openings), in the ceiling (i.e., the floor of an attic) for the purpose of providing special sheet metal brackets onto which the duct board is connected. Both the taping and the framing in operations described require considerable time and thus represent a substantial expense in the installation of a central heating or air conditioning system.

It is thus an object of this invention to provide apparatus for connecting various members of a duct board type of duct work system to each other to provide both a structural and relatively air tight relationship without the need of relying primarily on tape and staples for the structural connection.

It is another object invention invention to provide such an apparatus for also permitting the connection between the duct system and air inlet or outlet openings in a ceiling without the need for constructing special framing about the openings.

Another object of this inve ntion is to provide such connecting apparatus which is relatively inexpensive to make and can be readily adapted to provide a connection between different components of a duct work system from just a few basic components.

Another object of this invention is to provide such apparatus and method of installing same wherein the connecting apparatus includes means for supporting it about an opening prior to installation of a duct board member.

Another object is to provide such apparatus and methods employing same which permit substantial savings in time in the installation of an air flow duct system as compared to the time required to install such a system with prior, conventional connecting apparatus.

Another object of this invention is to provide a novel pull tie for use with the connecting apparatus of the invention.

These and other objects of this invention, which will be apparent upon consideration of the attached drawings and claims and the following description of the drawings, are accomplished in accordance with the illustrated preferred embodiments of this invention by providing connecting apparatus including an elongated strip member made of relatively rigid, but foldable sheet material, such as a light gauge steel or aluminum, which may be readily bent transversely (or longitudinally, if required) to various required shapes to overlap at least the end of one duct member made of duct board for connecting that end to an adjacent duct member or connect it about an opening in a wall providing an air inlet or outlet. Spaced apart openings are provided along at least one portion of the length of the strip member which portion is adapted to overlap the end of the duct board member. Another portion of the length of the strip member is adapted to overlap another member of the duct work, such as the ceiling around an opening, a sheet metal plenum, or another section of duct board, and means generally is provided in association with this portion for connecting it to the member which it overlaps. The connecting apparatus also includes a plurality of tie means which are adapted to pass through the openings in the strip member to penetrate and pass through a duct board member to be connected, and the tie means are adapted to be manipulated from the side of the opening through which it was inserted in a manner to secure the strip member to the duct board member. It is preferred that tie means be pull ties having an enlarged spear-like head portion and a pull or tail portion, operating on the principle of a blind fastener.

In one embodiment of the connecting apparatus of this invention, the elongated strip members are bent longitudinally to form L-shaped members or grill strips which may then be bent transversely and cut to form connecting apparatus for connecting a duct board member to an opening in a wall forming an air inlet or outlet over which a grill may be connected. In another embodiment of this invention the elongated strip member may either be a flat member or an L-shaped member including an S-shaped connector for connecting a duct board member to a sheet metal plenum, or, separate S-shaped connecting strips can be provided for connecting a flat, elongated strip member to a sheet metal plenum. The flat, elongated strip member may also be cut and bent to provide for connection between two duct board members running perpendicular to each other. In all the applications mentioned a plurality of the pull ties of this invention are utilized for connecting the elongated strip member to a duct board member. Thus, with but two basic components, i.e. a sheet metal strip member cut and bent to a desired size and shape, with appropriate slots or holes in it, and a plurality of pull ties, all the connections described and others required in the installation of the duct work of an air flow system can be made readily and economically.

Also, with respect to the grill strip utilized to connect a duct board member about air inlet or outlet, means, such as tabs, can be provided in the strip member, as herein described to permit a installation of the connecting apparatus of this invention by a novel method wherein the tabs are utilized to support the connecting apparatus about a wall opening prior to connection to a duct board member.

In the drawings, wherein like reference numerals are used throughout to designate like parts, and wherein preferred embodiments of this invention are illustrated;

FIG. 1 is a view in elevation of a typical central heating and air conditioning system which may employ the connecting apparatus of this invention in its various forms;

FIG. 2 is a view in elevation of one form of elongated strip member of this invention for use as a grill strip for connecting a duct board member about an opening in a wall;

FIG. 3 is a partial cut away view in elevation illustrating the installation of the strip member of FIG. 2 about an opening in a wall;

FIG. 4 is a top view in elevation of a preferred form of a pull tie utilized to connect the strip member of this invention to a duct board member;

FIGS. 5 and 6 are views in elevation illustrating the operation of the pull tie of FIG. 4;

FIG. 7 is a view in elevation illustrating another form of the connecting apparatus of this invention for use in connecting a duct board member to a sheet metal plenum;

FIG. 8 is a view in elevation of another form of the elongated strip member of this invention for use as connecting apparatus for connecting a duct board member to a sheet metal plenum;

FIG. 9 is a cross sectional view illustrating the use of the connecting apparatus of FIG. 8;

FIG. 10 is an exploded view in elevation showing another form of the elongated strip member of this invention for use as connecting apparatus for connecting duct board to a sheet metal plenum.

FIG. 11 is a sectional view taken at 11—11 in FIG. 10, but with the components of FIG. 10 joined, illustrating in detail the connection formed by the components of FIG. 10;

FIG. 12 is a view in elevation of another form of the elongated strip member of this invention for use as connecting apparatus for connecting two duct board members running perpendicular to each other; and FIG. 13 is a partial cut away view in elevation showing use of the connecting apparatus of FIG. 12.

Referring now to the drawings, FIG. 1 illustrates a typical air flow system such as a central heating and air conditioning system for installation in the attic of a home. The central unit includes an air return box or plenum 10, which may be made of sheet metal or duct board, through which air is drawn into the system for heating or cooling, a heater and blower unit 11, an evaporator 12, and an air outlet plenum unit 13 for distributing conditioned air to the duct members of the system. Heating unit 11 is coupled to evaporator unit 12 through a sheet metal or duct board section 14. Also, connected to plenums 10 and 13 are duct work members 15 which extend out into the attic to carry air for discharge, or to return air to the central system. Duct members 15 may be made of duct board, such as a fiber glass material with an aluminum foil outer covering 15A (see FIG. 3), and where these members are connected into the central system, or into each other, or to air outlets or inlets in the attic wall, it is necessary to provide some connecting apparatus such as provided by the present invention. An important feature of the present invention is that by use of the same basic components and connecting techniques all of the connections described can be made where one of the members to be connected is made of duct board. For the purposes of illustration of the present invention, as the various connecting apparatus of the present invention are described, reference will be made to their various positions of use in the central air flow system of FIG. 1. For sake of convenience, positions in the air flow system where identical connecting apparatus can be used are identified by the same letter designation.

Referring now to FIGS. 2 and 3, a preferred form of connecting apparatus, which would be typically installed at positions A in FIG. 1, is illustrated for connecting and installing a duct board member about an air inlet or outlet in a wall W, such as an attic wall W. FIG. 2 illustrates an elongated strip member 20, hereafter referred to as a grill strip, which initially may be formed from a relatively thin, flat sheet material such as aluminum or light gauge steel. The sheet material should be rigid enough to provide structural support for the connection made, but should be flexible enough so that it can be readily cut and bent to the shape and size required, and its length should be sufficient so that it can be bent to form at least one complete connecting apparatus as described with respect to FIG. 3. Grill strip 20 may be bent at 21A along its length to form an L-shaped member having an elongated portion 21 forming the long leg of the L, and an elongated portion 22 forming the short leg of the L. Prior to, or after such bending, a plurality of slotted openings 23 may be cut along the length of portion 21 at spaced intervals, and a plurality of tabs 24, which may be bent perpendicular to portion 21, may be cut in portion 21 between openings 23. The spacing and number of openings 23 and tabs 24 along elongated portion 21 is not critical and they may generally be several inches apart. For example, with duct board ducts that are 6 inches by 6 inches widths in inside measurements, a spacing of 1 ½ inches between slots 23 would be suitable, as would similar spacing between tabs 24. After the L-shaped grill strip 20 is formed as described, and it is desired to provide a connection between an end of a duct member 15 and an opening in wall W (such an opening assumed to be square in FIG. 3 for connection to a duct board member having a square cross section), strip 20 may be cut along portion 22 such as at 25A and bent transversely such as at 25B to form a closed polygonal structure or box 26 adapted to fit into and about the opening in wall W. In this case, elongated portion 22 will form a lip, divided into four sections and abutted against the lower edge of wall W as shown in FIG. 3, (only three sides of the box structure are actually shown in FIG. 3), and with portion 21 extending through the opening in wall W to provide a flange to which an end of duct board member 15 may be connected. Again as an example, if a 6 by 6 inch duct board is being used, so that the opening in wall W is approximately 6 inches on a side, a 2 foot section of grill strip 20 can be cut and bent at approximately 6 inch intervals to provide box 26.

In installing box 26 (its shape being determined by the shape of the opening in wall W), if this is done before duct board member 15 is to be installed, tabs 24 can be bent over the top edge of wall W (the tabs being of sufficient length to accommodate different thicknesses of walls) to support box 26 about the opening in wall W until the duct board member is connected to it. If, on the other hand, the end of duct board member 15 is already in place about the opening in wall W when box 26 in installed, then box 26 can be directly connected to the duct board member as hereafter described and this connection will support box 26 in place without the use of tabs 24.

When the end of duct board member 15 is placed about portion 21, the inside wall of duct board member 15 overlaps portion 21 with openings 23 aligned adjacent the overlapped portion of duct board member 15. To secure box 26 to duct board member 15, a plurality of tie means are provided each of which are adapted to pass through one of openings 23, penetrate and pass through duct board member 15, and then be manipulated from the side of opening 23 through which they are inserted, i.e. from inside the opening in wall W, to secure the duct board member to the connecting apparatus formed by box 26. A preferred form of this tie means, which functions as a pull tie 27, is illustrated in FIGS. 4–6, and is also shown in use in FIG. 3. Pull tie 27 includes a head portion 28 having a pointed end and also having flanges or fingers 29 and 30 extending away from head portion 28 on each side of a longer tail or pull portion 31 connected to head portion 28. Tail portion 31 is connected to head portion 28 intermediate flanges 29 and 30 and at a connection point 31A, and the flanges extend beyond connection point 31A in the direction away from the pointed end of head portion 28. As shown in FIG. 5, head portion 28 and flanges 29 and 30 are bent at a slight acute angle with respect to tail portion 31, with the ends of flanges 29 and 30 flared away from tail 31 such as at 29A and 30A so that after head portion 28 and flanges 29 and 30 have been passed through a duct board member 15 (FIG. 5), then tail portion 31 may be pulled in the direction to pull the pull tie back out of the duct board member, causing flanges 29 and 30 to abut against the duct board member away from the hole through which the pull tie passed, and causing head portion 28 to bend further at the connection point 31A with respect to tail portion 31, to the position of FIG. 6, where it substantially lies against the duct board member. Tail portion 31 then may be twisted as shown in FIG. 6 to keep it from passing through opening 23, and then be bent up or cut off as shown, and a shoulder 31B, wider than the widths of openings 23, may be provided in tail portion 31 at a point so that the narrower part of the tail is about as long as the thickness of duct 15. Thus shoulder 31B will prevent the passage of pull tie 27 through opening 23 in the direction of original insertion, after the tail is twisted. It is preferred that pull ties 27 be made of a relatively thin bendable, metal, for example, 0.016 inch thick galvanized steel and be sufficiently stiff that fingers 29 and 30 will return to the position of FIG. 5 when passed through duct board 15.

After the pull ties 27 have been inserted in openings 23 and secured as described, duct tape (not shown) can be applied about the outside lower end of duct board member 15. Also, a grill 32 may be installed about the opening in wall W and secured to lip 22 and for this purpose spaced holes 33 may be provided in lip 22 for receipt of sheet metal screws 34.

Of course, pull tie 27, which functions as a blind fastener, may take other forms. For example, tail portion 31 could be a thin, relatively stiff wire connected to head portion 28.

Referring now to FIG. 7, another form of the strip member of this invention is shown for connection to an outwardly extending flange 35 about an opening in the side of a sheet metal plenum such as plenum 13 in FIG. 1. The positions of use of the strip member of FIG. 7 may be at positions B in FIG. 1.

As shown in FIG. 7, an elongated strip member 36 made of light gauge sheet metal or aluminum is provided which includes spaced, slotted openings 37 along and adjacent to one long edge 36A of the strip member, and the other long edge of strip member 36 is formed into an S-shaped connecting flange which may be pushed over and about plenum 13. Thus, after strip member 36 is so installed, and cut into sections for insertion all the way around the opening in box 13, then the edge of a duct board member 15 may be overlapped with the portion of strip member 36 including openings 37, with the inside of the duct board member lying on top of strip member 36. For this purpose, duct board member 15 should be a relatively short section of several feet so that pull ties 27 may be passed from the inside of the duct board member 15 through openings 37 and through duct board member 15 to secure the same to strip member 36. Thus, the connecting apparatus formed by the S-shaped strip member 36 and pull ties 27 may be used for connection of a duct board member to any other member of an air flow system having an external, outwardly extending flange. Also, since the typical duct board duct members come in 4 foot lengths with a male connecting flange on one and a female connecting flange on the other end, a shorter length of duct board can be cut from the standard piece and the unflanged end used for connecting to strip member 36, leaving the other end suitable for connection to another flanged end of a duct board member.

When an opening in a sheet metal plenum is provided, but does not include outwardly extending flanges 35, strip member 36 may be bent longitudinally such as shown in FIG. 8 to form an L-shaped member with the short leg of the L formed by S-shaped portion 38. Thus, with this configuration of strip member 36 the S-shaped portion 38 may be inserted over the edges forming the opening in plenum 13 as shown in FIG. 9. Again, pull ties 27 may be inserted through openings 37 and through duct board member 15 to form the complete connecting apparatus as shown. The connecting apparatus of FIGS. 8 and 9 may be used at positions B in the system of FIG. 1 where no external flange is provided.

With reference now to FIGS. 10 and 11, for the purpose of facilitating manufacture of the components of this invention, it may be desirable to manufacture elongated, flat strip members 39 with a plurality of slotted openings 40, spaced along a portion of strip member 39 adjacent to and along edge 41. The separate members 39 in FIG. 10 may be cut from a single strip member of light gauge steel or aluminum. Also, separate S-shaped strip members 42 may be provided which include a looped portion 42A into which the strip member 39, along a portion adjacent edge 43, may be inserted, and a second looped portion 42B into which the edge of a sheet metal plenum 13 such as shown as 44 in FIG. 10 may be inserted. The connection made is shown in detail in FIG. 11. After such a connection is made then a duct board member 15 can be attached to strip member 39 by a plurality of pull ties 27.

While a number of different embodiments of the connecting apparatus of this invention are disclosed, the specific shape and size of a particular connecting strip will depend on the application to which it is to be put. For example, the L-shaped strip members of FIG. 2 can be provided without the spaced tabs 24 and with slotted openings spaced along lip 22 to permit connection to be made between a duct board member 15 running in one direction and a second duct board member running perpendicular thereto, such as at positions C in FIG. 1. Such an L-shaped strip member is illustrated in FIG. 12. In this case, an opening of suitable size would be cut in the side of a duct board member 15, for example 6 × 6 inches for an standard size duct board, and such a L-shaped strip of suitable length secured by pull ties 27 about the opening cut. If the opening is the full width of the duct board member 15, then a flat strip member with spaced slotted openings 50A along both long edges, may be used, such as illustrated at 51 in FIG. 13, the view being cut away to shown the bottom connecting strip 51. At any rate, outwardly extending connecting flanges for perpendicular connection to a second duct board member are thus provided, so the connection illustrated in FIG. 13 can be made.

If desired, one basic flat strip with slotted openings along one edge can be provided to provide the flat and L-shaped (but not the S-shaped) strip member described. However, it may be desirable to use different width strips for different applications. By way of example, for use with 6 × 6 inch duct board, the grill strip 20 may be made from a length of 0.016 inch galvanized steel 2¾ inches wide, and bent longitudinally so that portion 21 is 2 inches wide, and portion 22 is ¾ inch wide. However, if the L-shaped strip to be formed is to be used for connecting one duct board member into another at a right angle, the total width of the strip should be larger, i.e. 4 inches with one leg of the L being 2½ inches and the other leg of the L being 1½ inches. A wide variation in these sizes will be suitable, however, and the basic components of this invention can be sized and shaped to meet a particular installation requirement.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is comtemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an air flow system having a duct board member connected to another member of the system, the connection between said duct board member and said another member comprising an elongated strip member overlapped with the inside of said members to provide connection therebetween, said strip member including a plurality of spaced openings adjacent said duct board member and means connecting said strip member to said another member adjacent said another member; and a plurality of blind fasteners separate from said strip member with one of said blind fasteners being provided in each of at least a substantial number of said spaced openings to provide connection between said duct member and said strip member, each of said blind fasteners being a pull tie comprising an enlarged head portion lying substantially against the outside of said duct board member, and a tail portion extending from said head portion through said duct board member and one of said spaced openings, said tail portion being laterally enlarged adjacent said strip member to prevent passage through said opening in the direction of original insertion.

2. Apparatus for connecting adjacent duct members of an air flow system wherein at least one of said members is made of duct board, comprising, in combinaation: an elongated, relatively stiff, strip member including a first longitudinally extending portion for overlapping an end of the duct board member and a second longitudinal extending portion for overlapping an adjacent part of the other duct member to provide means by which the strip member may be secured to the other duct member, and a plurality of tie means each having a head end and a tail end, the head end being adapted to pass through said first portion of the strip member and to penetrate and pass through the overlapped end of said duct board member, and having a laterally enlarged portion which prevents its return through said duct board member so that the tail end of the tie means may be manipulated in a manner to secure said duct board member to the first portion of said strip member.

3. The apparatus of claim 2, wherein said first portion of said strip member has a plurality of openings spaced therealong through which the head ends of the tie means are adapted to pass.

4. The apparatus of claim 2, wherein the first portion is bent transversely of its length into a shape for overlapping the end of a correspondingly shaped duct board member.

5. The apparatus of claim 2, wherein the other duct member comprises a wall having an opening to which the end of the duct board member is to be connected, and said strip member is bent along its length into an "L"-shape, with said first portion of said strip member forming one leg of the L adapted to extend through the opening, and the second portion thereof forming the other leg of the L adapted to overlap the wall adjacent the opening.

6. The apparatus of claim 5, wherein said first portion of said strip member has a plurality of openings spaced therealong through which the head ends of the tie means are adapted to pass.

7. The apparatus of claim 5, wherein the first portion is bent transversely of its length into a shape for overlapping the end of a correspondingly shaped duct board member.

8. The apparatus of claim 5, wherein said first portion has tab means spaced therealong above said second portion of the strip member to receive the overlapped part of the duct member therebetween.

9. The apparatus of claim 8, wherein said first portion of said strip member has a plurality of openings therealong through which the head ends of the tie means are adapted to pass.

10. The apparatus of claim 8, wherein the first portion is bent transversely of its length into a shape for overlapping the end of a correspondingly shaped duct board member.

11. The apparatus of claim 5, wherein the second portion of the strip member includes an "S"-shaped means for connecting it to the overlapped part of the other duct member.

12. The apparatus of claim 11 wherein said first portion of said strip member has a plurality of openings therealong through which the head ends of the tie means are adapted to pass.

13. The apparatus of claim 5, including additional tie means for securing said second portion to the overlapped part of said other duct member.

14. The apparatus of claim 13, wherein said first and second portions of said strip member have a plurality of openings spaced therealong through which the head ends of the tie means are adapted to pass.

15. The apparatus of claim 2, wherein the second portion of said strip member includes an S-shaped means for connecting it to the overlapped part of the other duct member.

16. The apparatus of claim 15, wherein said first portion of said strip member has a plurality of openings spaced therealong through which the head ends of the tie means are adapted to pass.

17. The apparatus of claim 2, including an S-shaped member adapted to slide over the first and second portions of the strip member to connect them to one another.

18. The apparatus of claim 17, wherein said first portion of said strip member has a plurality of openings spaced therealong through which the head ends of the tie means are adapted to pass.

* * * * *